US006965610B2

(12) United States Patent
Creigh

(10) Patent No.: US 6,965,610 B2
(45) Date of Patent: Nov. 15, 2005

(54) SYSTEM AND METHOD FOR PROVIDING COMPATIBILITY BETWEEN DIFFERENT TRANSCEIVERS IN A MULTI-PAIR COMMUNICATION SYSTEM

(75) Inventor: John L. Creigh, Rancho Santa Margarita, CA (US)

(73) Assignee: Broadcom Corporation, Irvine, CA (US)

( * ) Notice: Subject to any disclaimer, the term of this patent is extended or adjusted under 35 U.S.C. 154(b) by 794 days.

(21) Appl. No.: 09/747,327

(22) Filed: Dec. 21, 2000

(65) Prior Publication Data

US 2002/0027888 A1    Mar. 7, 2002

Related U.S. Application Data

(60) Provisional application No. 60/172,102, filed on Dec. 23, 1999.

(51) Int. Cl.$^7$ .................................................. H04B 1/38
(52) U.S. Cl. ..................... 370/465; 375/220; 375/222
(58) Field of Search ................................. 370/276, 282, 370/465, 466, 479, 467; 709/208, 209, 227, 709/228, 230, 237; 375/222, 220

(56) References Cited

U.S. PATENT DOCUMENTS

| | | | | |
|---|---|---|---|---|
| 4,394,767 A | * | 7/1983 | Shum ........................... 375/231 |
| 4,953,210 A | * | 8/1990 | McGlynn et al. ............. 380/266 |
| 5,311,578 A | * | 5/1994 | Bremer et al. ............. 379/93.32 |
| 5,557,634 A | | 9/1996 | Balasubramanian et al. ..... 375/222 |
| 5,809,066 A | * | 9/1998 | Suomi et al. ................ 375/222 |
| 5,878,387 A | * | 3/1999 | Oshikiri et al. .............. 704/207 |
| 5,918,174 A | * | 6/1999 | Chennakeshu et al. ...... 455/427 |
| 5,991,642 A | * | 11/1999 | Watanabe et al. ........... 455/560 |
| 6,002,722 A | | 12/1999 | Wu .............................. 375/295 |
| 6,081,556 A | * | 6/2000 | Holmquist ................... 375/242 |
| 6,151,300 A | * | 11/2000 | Hunt et al. .................. 370/231 |
| 6,700,510 B1 | * | 3/2004 | Kryzak et al. ................. 341/59 |
| 2001/0036226 A1 | * | 11/2001 | McLaughlin et al. | |
| 2002/0114347 A1 | * | 8/2002 | Park | |
| 2002/0181633 A1 | * | 12/2002 | Trans .......................... 375/354 |

OTHER PUBLICATIONS

Hiumin Xia, et al, "A Mixed-Signal Behavioral Level Implementation of 1000BASE-X Physical Layer for Gigabit Ethernet," Proceedings of the 1999 IEEE International Symposium on Circuits and Systems. VLSI, 1999, pp. 431-434, vol. 1, XP002172910, IEEE, Piscataway, NJ, USA.

* cited by examiner

Primary Examiner—Melvin Marcelo
(74) Attorney, Agent, or Firm—McAndrews, Held & Malloy, Ltd.

(57) ABSTRACT

A system and method are disclosed that provide for compatibility between different generations of transceivers, such as Gigabit Ethernet transceivers. According to the invention, a novel transceiver is provided that includes a physical layer entity (PHY) comprising a physical coding sublayer (PCS) and a physical medium attachment (PMA) sublayer. In one embodiment, the PHY is designed to switch the PCS encoding/decoding scheme to a legacy-based encoding/decoding scheme in a situation where it is determined that the remote transceiver in communication with the novel transceiver is transmitting data according to a legacy-based scheme.

13 Claims, 10 Drawing Sheets

$Sy_n[0] = Scr_n[0]$ $Sy_n[1] = g(Scr_n[0]) = Scr_n[3] \wedge Scr_n[8]$ $Sy_n[2] = g^2(Scr_n[0]) = Scr_n[6] \wedge Scr_n[16]$ $Sy_n[3] = g^3(Scr_n[0]) = Scr_n[9] \wedge Scr_n[14] \wedge Scr_n[19] \wedge Scr_n[24]$ $Sx_n[0] = X_n = Scr_n[4] \wedge Scr_n[6]$ $Sx_n[1] = g(X_n) = Scr_n[7] \wedge Scr_n[9] \wedge Scr_n[12] \wedge Scr_n[14]$ $Sx_n[2] = g^2(X_n) = Scr_n[10] \wedge Scr_n[12] \wedge Scr_n[20] \wedge Scr_n[22]$ $Sx_n[3] = g^3(X_n) = Scr_n[13] \wedge Scr_n[15] \wedge Scr_n[18] \wedge Scr_n[20] \wedge Scr_n[23] \wedge Scr_n[25] \wedge Scr_n[28] \wedge Scr_n[30]$ $Sg_n[0] = Y_n = Scr_n[1] \wedge Scr_n[5]$ $Sg_n[1] = g(Y_n) = Scr_n[4] \wedge Scr_n[8] \wedge Scr_n[9] \wedge Scr_n[13]$ $Sg_n[2] = g^2(Y_n) = Scr_n[7] \wedge Scr_n[11] \wedge Scr_n[17] \wedge Scr_n[21]$ $Sg_n[3] = g^3(Y_n) = Scr_n[10] \wedge Scr_n[14] \wedge Scr_n[15] \wedge Scr_n[19] \wedge Scr_n[20] \wedge Scr_n[24] \wedge Scr_n[25] \wedge Scr_n[29]$

FIG. 4

$$Sy_n[0] = Scr_{n+1}[0]$$

$$Sy_n[1] = g(Scr_n[0]) = Scr_n[3] \wedge Scr_n[8]$$

$$Sy_n[2] = g^2(Scr_n[0]) = Scr_n[6] \wedge Scr_n[16]$$

$$Sy_n[3] = g^3(Scr_n[0]) = Scr_n[9] \wedge Scr_n[14] \wedge Scr_n[19] \wedge Scr_n[24]$$

$$Sx_n[0] = X_n = Scr_n[4] \wedge Scr_n[6]$$

$$Sx_n[1] = g(X_n) = Scr_n[7] \wedge Scr_n[9] \wedge Scr_n[12] \wedge Scr_n[14]$$

$$Sx_n[2] = g^2(X_n) = Scr_n[10] \wedge Scr_n[12] \wedge Scr_n[20] \wedge Scr_n[22]$$

$$Sx_n[3] = g^3(X_n) = Scr_n[13] \wedge Scr_n[15] \wedge Scr_n[18] \wedge Scr_n[20] \wedge Scr_n[23] \wedge Scr_n[25] \wedge Scr_n[28] \wedge Scr_n[30]$$

$$Sg_n[0] = Y_n = Scr_n[1] \wedge Scr_n[5]$$

$$Sg_n[1] = g(Y_n) = Scr_n[4] \wedge Scr_n[8] \wedge Scr_n[9] \wedge Scr_n[13]$$

$$Sg_n[2] = g^2(Y_n) = Scr_n[7] \wedge Scr_n[11] \wedge Scr_n[17] \wedge Scr_n[21]$$

$$Sg_n[3] = g^3(Y_n) = Scr_n[10] \wedge Scr_n[14] \wedge Scr_n[15] \wedge Scr_n[19] \wedge Scr_n[20] \wedge Scr_n[24] \wedge Scr_n[25] \wedge Scr_n[29]$$

FIG. 5

|  | First Autonegotiation cycle | | Second Autonegotiation cycle | |
|---|---|---|---|---|
|  | PHY A | PHY B | PHY A | PHY B |
| PHY Type | legacy | legacy | N/A | |
| Master/Slave | Master | Slave | | |
| EncodingType | legacy | legacy | | |
| Result | Link up | Link up | | |

FIG. 7

|  | First Autonegotiation cycle | | Second Autonegotiation cycle | |
|---|---|---|---|---|
|  | PHY A | PHY B | PHY A | PHY B |
| PHY Type | legacy | Other | N/A | |
| Master/Slave | Master | Slave | | |
| EncodingType | legacy | Either | | |
| Result | Link up | Detects legacy encoding, sets EncodingType to legacy, starts transmitting IDLE and links up. | | |

FIG. 8

|  | First Autonegotiation cycle | | Second Autonegotiation cycle | |
|---|---|---|---|---|
|  | PHY A | PHY B | PHY A | PHY B |
| PHY Type | legacy | Other | N/A | |
| Master/Slave | Slave | Master | | |
| EncodingType | legacy | legacy | | |
| Result | Link up | Link up | | |

FIG. 9

|  | First Autonegotiation cycle | | Second Autonegotiation cycle | |
|---|---|---|---|---|
|  | PHY A | PHY B | PHY A | PHY B |
| PHY Type | legacy | Other | legacy | Other |
| Master/Slave | Slave | Master | Slave | Master |
| EncodingType | legacy | Normal | legacy | legacy |
| Result | Fails to link, restarts autonegotiation | Fails to link, flips EncodingType to legacy, restarts autonegotiation | Link up | Link Up |

FIG. 10

|  | First Autonegotiation cycle | | Second Autonegotiation cycle | |
|---|---|---|---|---|
|  | PHY A | PHY B | PHY A | PHY B |
| PHY Type | Other | Other | legacy | Other |
| Master/Slave | Master | Slave | N/A | |
| EncodingType | legacy | legacy | | |
| Result | Link Up | Link Up | | |

FIG. 11

|  | First Autonegotiation cycle | | Second Autonegotiation cycle | |
|---|---|---|---|---|
|  | PHY A | PHY B | PHY A | PHY B |
| PHY Type | Other | Other | N/A | |
| Master/Slave | Master | Slave | | |
| EncodingType | legacy | Normal | | |
| Result | Link Up | Detects legacy encoding, sets EncodingType to legacy, starts transmitting IDLE and links up. | | |

FIG. 12

|  | First Autonegotiation cycle | | Second Autonegotiation cycle | |
|---|---|---|---|---|
|  | PHY A | PHY B | PHY A | PHY B |
| PHY Type | Other | Other | N/A | |
| Master/Slave | Master | Slave | | |
| EncodingType | Normal | Normal | | |
| Result | Link Up | Link Up | | |

FIG.13

|  | First Autonegotiation cycle | | Second Autonegotiation cycle | |
|---|---|---|---|---|
|  | PHY A | PHY B | PHY A | PHY B |
| PHY Type | Other | Other | N/A | |
| Master/Slave | Master | Slave | | |
| EncodingType | Normal | legacy | | |
| Result | Link Up | Detects normal encoding, sets EncodingType to normal, starts transmitting IDLE and links up. | | |

FIG.14

SYSTEM AND METHOD FOR PROVIDING COMPATIBILITY BETWEEN DIFFERENT TRANSCEIVERS IN A MULTI-PAIR COMMUNICATION SYSTEM

CROSS-REFERENCE TO RELATED APPLICATION(S)

The present application claims priority on the basis of the following provisional application: Ser. No. 60/172,102 entitled "Algorithm for Gigabit PCS Compatibility" filed on Dec. 23, 1999.

BACKGROUND OF THE INVENTION

The present invention relates generally to high-speed multi-pair communication systems, for example, Gigabit Ethernet systems (also called 1000BASE-T standard). More particularly, the invention relates to systems and methods that provide for interoperability between different types of transceivers included in those communication systems.

In recent years, local area network (LAN) applications have become more and more prevalent as a means for providing local interconnect between personal computer systems, work stations and servers. Because of the breadth of its installed base, the 10BASE-T implementation of Ethernet remains the most pervasive, if not the dominant, network technology for LANs. However, as the need to exchange information becomes more and more imperative, and as the scope and size of the information being exchanged increases, higher and higher speeds (greater bandwidth) are required from network interconnect technologies. Among the high-speed LAN technologies currently available, fast Ethernet, commonly termed 100BASE-T, has emerged as one viable solution. Fast Ethernet technology provides a smooth, non-disruptive evolution from the 10 megabit per second (Mbps) performance of 10BASE-T applications to the 100 Mbps performance of 100BASE-T. The growing use of 100BASE-T interconnections between servers and desktops is creating a definite need for an even higher speed network technology at the backbone and server level.

Another suitable solution to this need has been provided by the IEEE 802.3 standard for gigabit Ethernet, also termed 1000BASE-T, as set forth in "IEEE Std. 802.3, 1998 Edition", the disclosure of which is hereby expressly incorporated by reference. As described in the standard, a Gigabit Ethernet network is designed to provide 1 gigabit per second (Gbps) bandwidth in combination with the simplicity of an Ethernet architecture, at a lower cost than other technologies of comparable speed. Moreover, gigabit Ethernet offers a smooth, seamless upgrade path for present 10BASE-T or 100BASE-T Ethernet installations.

In order to obtain the requisite gigabit performance levels, gigabit Ethernet transceivers are interconnected by means of a multi-pair transmission channel architecture. In particular, transceivers are interconnected using four separate pairs of twisted Category-5 copper wires. Gigabit communication, in practice, involves the simultaneous, parallel transmission of information signals, with each signal conveying information at a rate of 250 megabits per second (Mb/s). Simultaneous, parallel transmission of four information signals over four twisted wire pairs poses substantial challenges to bidirectional communication transceivers, even though the data rate on any one wire pair is "only" 250 Mbps.

The IEEE 802.3 standard for gigabit Ethernet requires that the transceivers used in gigabit Ethernet operate according to certain transmission protocols. For example, a physical coding sublayer (PCS) included in the transceiver has certain transmit encoding rules that are based on the generation, at time n, of twelve bits, defined as $Sx_n[3:0]$, $Sy_n[3:0]$, and $Sg_n[3:0]$. Those bits are then used to generate a scrambler octet $Sc_n[7:0]$ for decorrelating a data word during transmission, for generating idle and training symbols, and for randomizing the signs of the encoded data signals so that each symbol stream has no dc bias.

Prior to acceptance of the IEEE 802.3 standard, gigabit Ethernet components were already in existence (hereinafter referred to as "legacy components"), many of which are still in use today. Some of those legacy components do not operate in a manner consistent with the protocols set forth in the IEEE 802.3 standard.

Therefore, there exists a need for a system and method that provide for interoperability between various generations of gigabit Ethernet transceivers that employ different transmission encoding schemes. The present invention addresses this need.

SUMMARY OF THE INVENTION

A system and method are disclosed for providing compatibility between different types of transceivers. According to the invention, a novel transceiver is provided that includes a physical layer entity (PHY) comprising a physical coding sublayer (PCS) and a physical medium attachment (PMA) sublayer.

In one embodiment, the PHY is designed to switch the PCS encoding/decoding scheme to a legacy-based encoding/decoding scheme in a situation where it is determined that the remote transceiver in communication with the novel transceiver is transmitting data in compliance with the legacy-based encoding scheme.

In one illustrative embodiment, if the PHY of the present invention resolves to a slave device during an Auto-Negotiation procedure, then the PHY monitors the channel A IDLE data being transmitted by the remote master device during training, and determines whether the data is consistent with a legacy encoding scheme, or with another (e.g., standard-compliant) scheme. A state variable is set to a particular value based on the results of the determination, which controls the encoding type used by the slave PHY.

In another embodiment, if the PHY resolves to a master device, then if it fails to achieve link-up with the remote slave device during a first Auto-Negotiation cycle, such that the Auto-Negotiation procedure is restarted in a second cycle, the master PHY changes encoding types so that in the next convergence cycle, the encoding is what the slave expects, and link up is then achieved.

BRIEF DESCRIPTION OF THE DRAWINGS

These and other features, aspects and advantages of the present invention will be more fully understood when considered with respect to the following detailed description, appended claims and accompanying drawings, wherein:

FIG. 4 is a table of encoding standards utilized in connection with a normal (standard-compliant) encoding technique.

FIG. 5 is a table of encoding standards utilized in connection with a legacy-based encoding technique.

FIGS. 7 through 14 illustrate various scenarios in which the system of the present invention is utilized to achieve link-up between two transceivers.

DETAILED DESCRIPTION OF THE INVENTION

In the context of an exemplary integrated circuit-type bidirectional communication system, the present invention may be characterized as a system and method for providing compatibility between two transceivers in a communication system, where the respective transceivers are of different types and utilize different encoding schemes, for example, where one of the transceivers is a legacy-type transceiver and the other is designed so as to be compliant with the IEEE 802.3 standard (also termed 1000BASE-T standard).

The system and method of the present invention provide a transceiver that is able to alter its encoding/decoding scheme to match that of a remote transceiver, thereby making the transceiver of the present invention compatible with multiple generations of transceiver devices.

Figure 1:
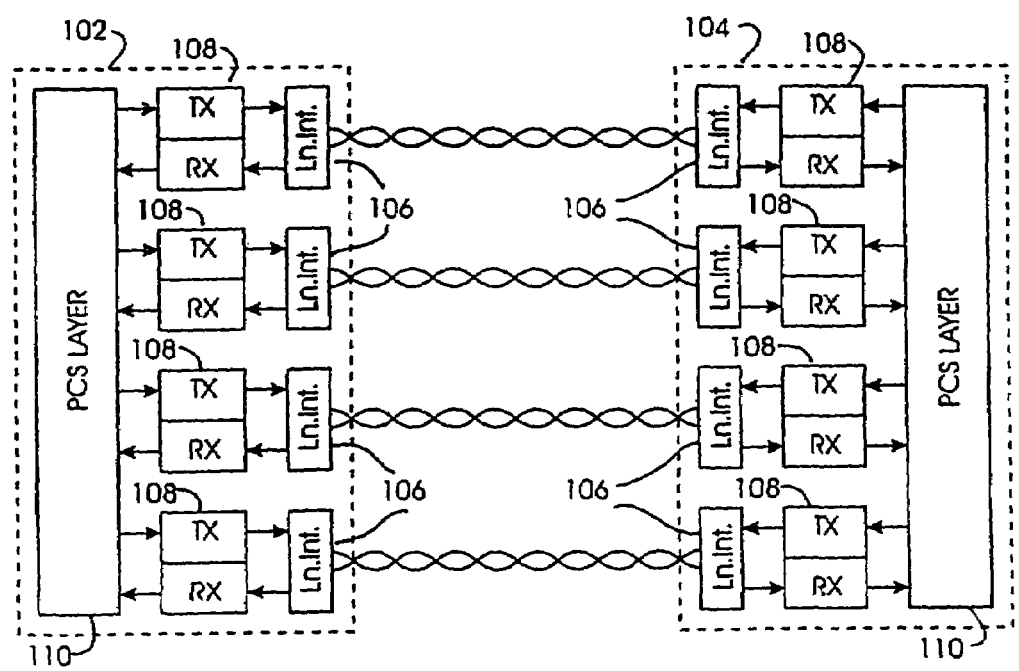
FIG. 1 is a simplified block diagram of a high-speed bidirectional communication system exemplified by two transceivers configured to communicate over multiple twisted-pair wiring channels.
Figure 2:
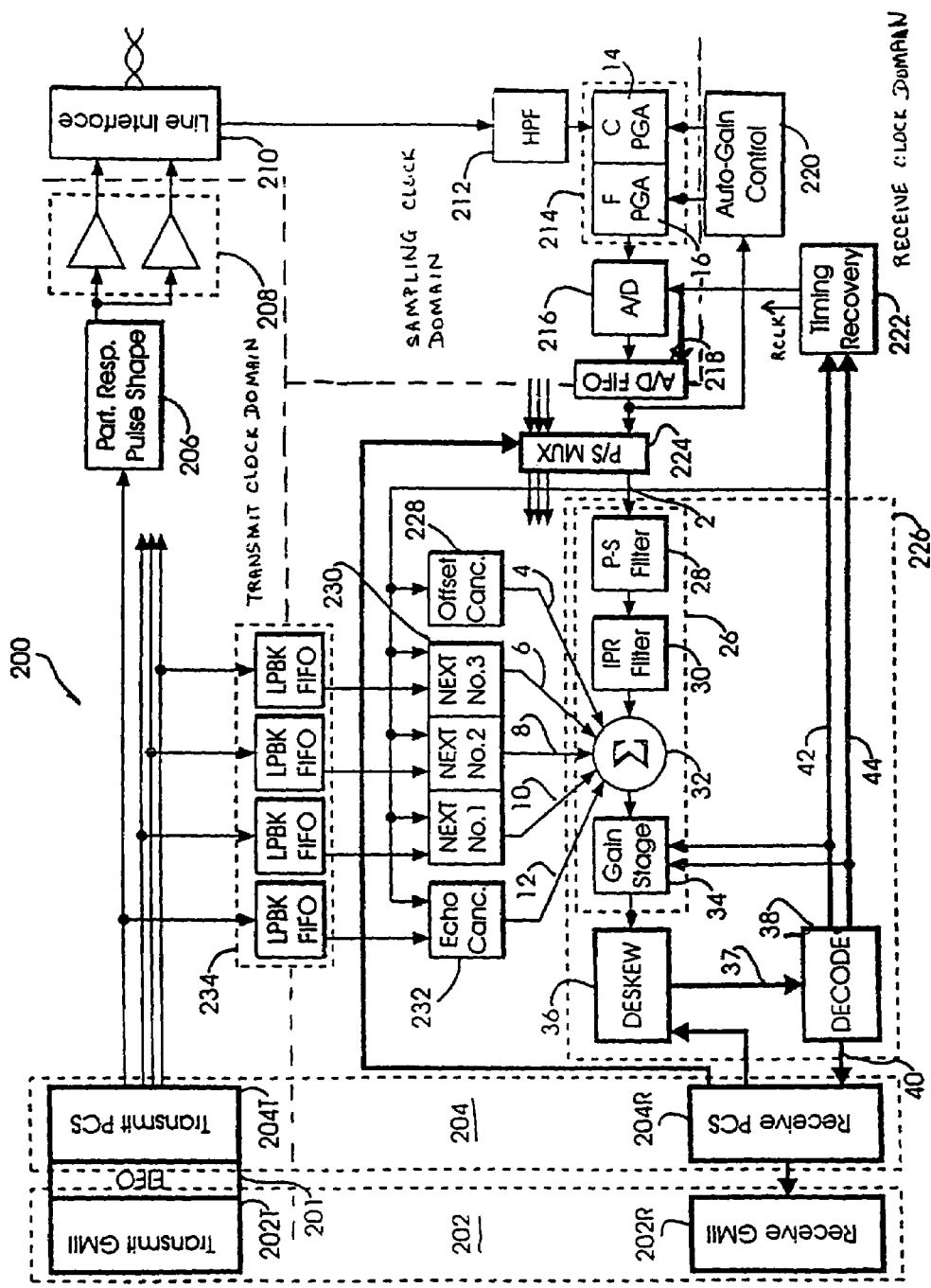
FIG. 2 is a simplified block diagram of one illustrative embodiment of a bidirectional communication transceiver system.

In order to appreciate the advantages of the present invention, it will be beneficial to describe the invention in the context of an exemplary bidirectional communication device, such as a gigabit Ethernet transceiver. The particular exemplary implementation chosen is depicted in FIGS. 1 and 2. FIG. 1 is a simplified block diagram of a multi-pair communication system operating in conformance with the IEEE 802.3 standard for one gigabit (Gb/s) Ethernet full-duplex communication over four twisted pairs of Category-5 copper wires.

The communication system illustrated in FIG. 1 is represented as a point-to-point system, in order to simplify the explanation, and includes two main transceiver blocks 102 and 104, coupled together with four twisted-pair cables. Each of the wire pairs is coupled between the transceiver blocks through a respective one of four line interface circuits 106 and serve to communicate information developed by respective ones of four transmitter/receiver circuits (constituent transceivers) 108 coupled between respective interface circuits and a physical coding sublayer (PCS) block 110 that is part of a physical layer entity (PHY) of the transceiver. Four constituent transceivers 108 are capable of operating simultaneously at 250 megabits per second (Mb/s), and are coupled through respective interface circuits to facilitate full-duplex bidirectional operation. Thus, one Gb/s communication throughput of each of the transceiver blocks 102 and 104 is achieved by using four 250 Mb/s (125 megabaud at 2 bits per symbol) constituent transceivers 108 for each of the transceiver blocks and four twisted pairs of copper cables to connect the two transceivers together.

FIG. 2 is a simplified block diagram of the functional architecture and internal construction of an exemplary transceiver block, indicated generally at 200, such as one of the transceivers 108 of FIG. 1. The transceiver block is described in greater detail in pending U.S. patent application Ser. No. 09/556,549, filed on Apr. 24, 2000, and entitled "Physical Coding Sublayer for a Multi-Pair Gigabit Transceiver", the disclosure of which is hereby expressly incorporated by reference. Since the illustrated transceiver application relates to gigabit Ethernet transmission, the transceiver will be referred to as the "gigabit transceiver". For ease of illustration and description, FIG. 2 shows only one of the four 250 Mb/s constituent transceivers which are operating simultaneously (termed herein 4-D operation). However, since the operation of the four constituent transceivers are necessarily interrelated, certain blocks in the signal lines in the exemplary embodiment of FIG. 2 perform and carry 4-dimensional (4-D) functions and 4-D signals, respectively. By 4-D, it is meant that the data from the four constituent transceivers are used simultaneously. In order to clarify signal relationships in FIG. 2, thin lines correspond to 1-dimensional functions or signals (i.e., relating to only a single transceiver), and thick lines correspond to 4-D functions or signals (relating to all four transceivers).

With reference to FIG. 2, the gigabit transceiver 200 includes a Gigabit Medium Independent Interface (GMII) block 202, a Physical Coding Sublayer (PCS) block 204, a pulse shaping filter 206, a digital-to-analog (D/A) converter 208, a line interface block 210, a highpass filter 212, a programmable gain amplifier (PGA) 214, an analog-to-digital (A/D) converter 216, an automatic gain control block 220, a timing recovery block 222, a pair-swap multiplexer block 224, a demodulator 226, an offset canceller 228, a near-end crosstalk (NEXT) canceller block 230 having three NEXT canceller, and an echo canceller 232. The gigabit transceiver 200 also includes an A/D first-in-first-out buffer (FIFO) 218 to facilitate proper transfer of data from the analog clock region to the receive clock region, and a FIFO block 234 to facilitate proper transfer of data from the transmit clock region to the receive clock region. The gigabit transceiver 200 can optionally include a filter to cancel far-end crosstalk noise (FEXT canceller).

On the transmit path, the transmit section of the GMII block 202 receives data from a Media Access Control (MAC) module (not shown in FIG. 2) and passes the digital data to the transmit section 204T of the PCS block 204 via a FIFO 201 in byte-wide format at the rate of 125 MHz. The FIFO 201 is essentially a synchronization buffer device and is provided to ensure proper data transfer from the MAS layer to the Physical Coding (PHY) layer, since the transmit clock of the PHY layer is not necessarily synchronized with the clock of the MAC layer. This small FIFO 201 can be constructed with from three to five memory cells to accommodate the elasticity requirement which is a function of frame size and frequency offset.

The transmit section 204T of the PCS block 204 performs scrambling and coding of the data and other control functions. Transmit section 204T of the PCS block 204 generates four 1D symbols, one for each of the four constituent transceivers. The 1D symbol generated for the constituent transceiver depicted in FIG. 2 is filtered by a partial response pulse shaping filter 206 so that the radiated emission of the output of the transceiver may fall within the EMI requirements of the Federal Communications Commission. The output of the pulse shaping filter 206 is converted to an analog signal by the D/A converter 208 operating at 125 MHz. The analog signal passes through the line interface block 210, and is placed on the corresponding twisted pair cable for communication to a remote receiver.

Figure 3:
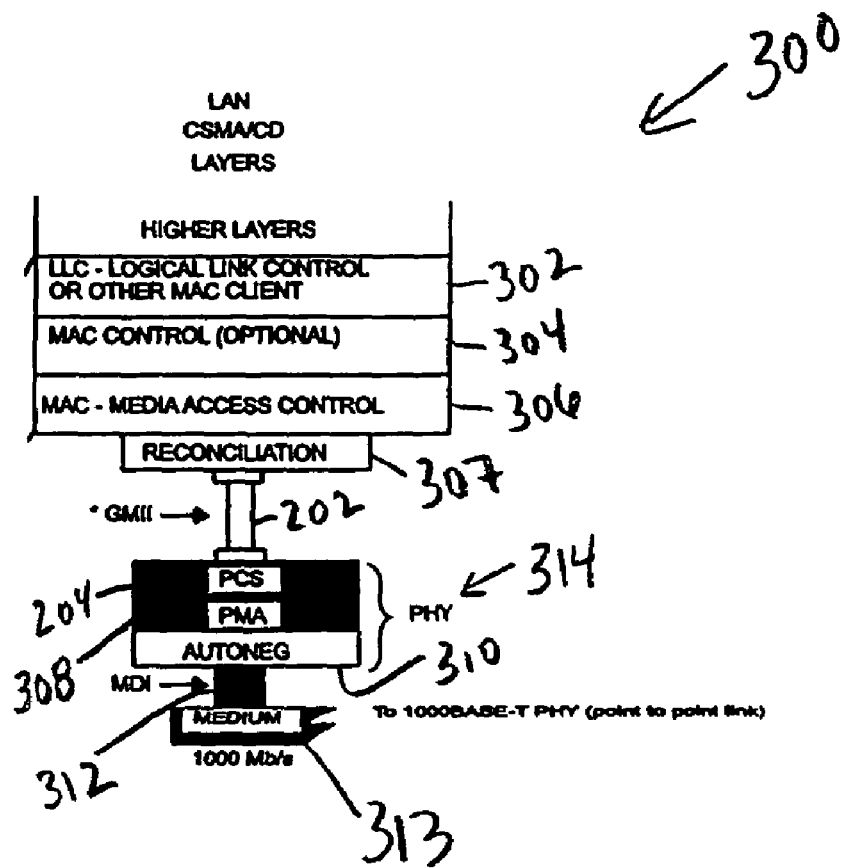
FIG. 3 is a simplified block diagram of the various layers included in a local area network (LAN).

Referring now to FIG. 3, there is shown a schematic diagram of a local area network (LAN) 300 and its associated layers. The LAN 300 includes a logical link control (LLC) layer 302, a media access control (MAC) control layer 304, a MAC layer 306, a reconciliation layer 307, the GMII layer 202, the PCS block 204, a physical medium attachment (PMA) 308, an Auto-Negotiation module 310, and a medium dependent interface 312 that connects to a medium 313, for example, the four pairs of twisted copper wires. The PCS 204, PMA 308, and Auto-Negotiation module 310 are constituent parts of a PHY, generally designated 314. LAN 300 may also include a number of higher layers as shown in FIG. 3.

As is well known, during bidirectional communication between two gigabit transceivers 102 and 104 (FIG. 1), through a process called "auto-negotiation" via Auto-Negotiation Module 310, one of the gigabit transceivers assumes the role of the master while the other assumes the role of the slave. When a gigabit transceiver assumes one of the two roles with respect to the remote gigabit transceiver, each of its constituent transceivers 108 assumes the same role with respect to the corresponding one of the remote constituent transceivers. Each constituent transceiver 108 is constructed such that it can be dynamically configured to act as either the master or the slave with respect to a remote constituent transceiver 108 during a bidirectional communication. The clocking relationship between the transmitter and receiver inside the constituent transceiver 108 depends on the role of the constituent transceiver (i.e., master or slave) and is different for each of the two cases.

In a conventional communication system, once the auto-negotiation procedure is successfully completed, the master and slave transceivers are linked to allow for the communication of data therebetween.

A problem can arise when different types of transceivers are connected together by a pair of twisted wires and attempt to communicate with each other. For example, different transceivers may use different encoding/decoding schemes, such that the data received by a transceiver will be decoded using the incorrect scheme. As one example, in a gigabit Ethernet system, the master and slave transceivers utilize side-stream scrambling by linear-feedback shift registers, where the bits stored in the shift register delay line are denoted by $Scr_n[32:0]$. For an IEEE-compliant transceiver, $Sy_n[0]$ is defined by the following equation:

$Sy_n[0]=Scr_n[0]$.

However, for a previous generation transceiver device, $Sy_n[0]$ is defined by the following equation:

$Sy_n[0]=Scr_{n+1}[0]$, where $Scr_{n+1}[0]=Scr_n[12]\hat{}Scr_n[32]$ for a master PHY, or $Scr_{n+2}[0]=Scr_n[12]\hat{}Scr_n[32]$ for a slave PHY.

Thus, the two transceivers are not typically compatible, which results in failure to achieve link-up between the transceivers, such that the transceivers are incapable of communicating with each other. The present invention addresses this problem.

According to the invention, the PHY 314 is designed so that it can operate according to multiple encoding schemes, for example, according to either a legacy encoding/decoding scheme or a normal (standard-compliant) encoding/decoding scheme. Thus, PHY 314 is provided with the equations for normal encoding (FIG. 4), as well as the equations for legacy encoding (FIG. 5). PHY 314 also maintains a state variable ("EncodingType") that controls the encoding/decoding mode of the corresponding PCS 204. For example, the EncodingType variable may be set to "0" for normal encoding/decoding, and to "1" for legacy encoding/decoding. The EncodingType variable is used by PHY 314 to control the encoding and decoding of both the transmit and receive blocks of the corresponding transceiver. Thus, the EncodingType state variable controls how PHY 314 both encodes outgoing signals as well as decodes incoming signals.

Figure 6:
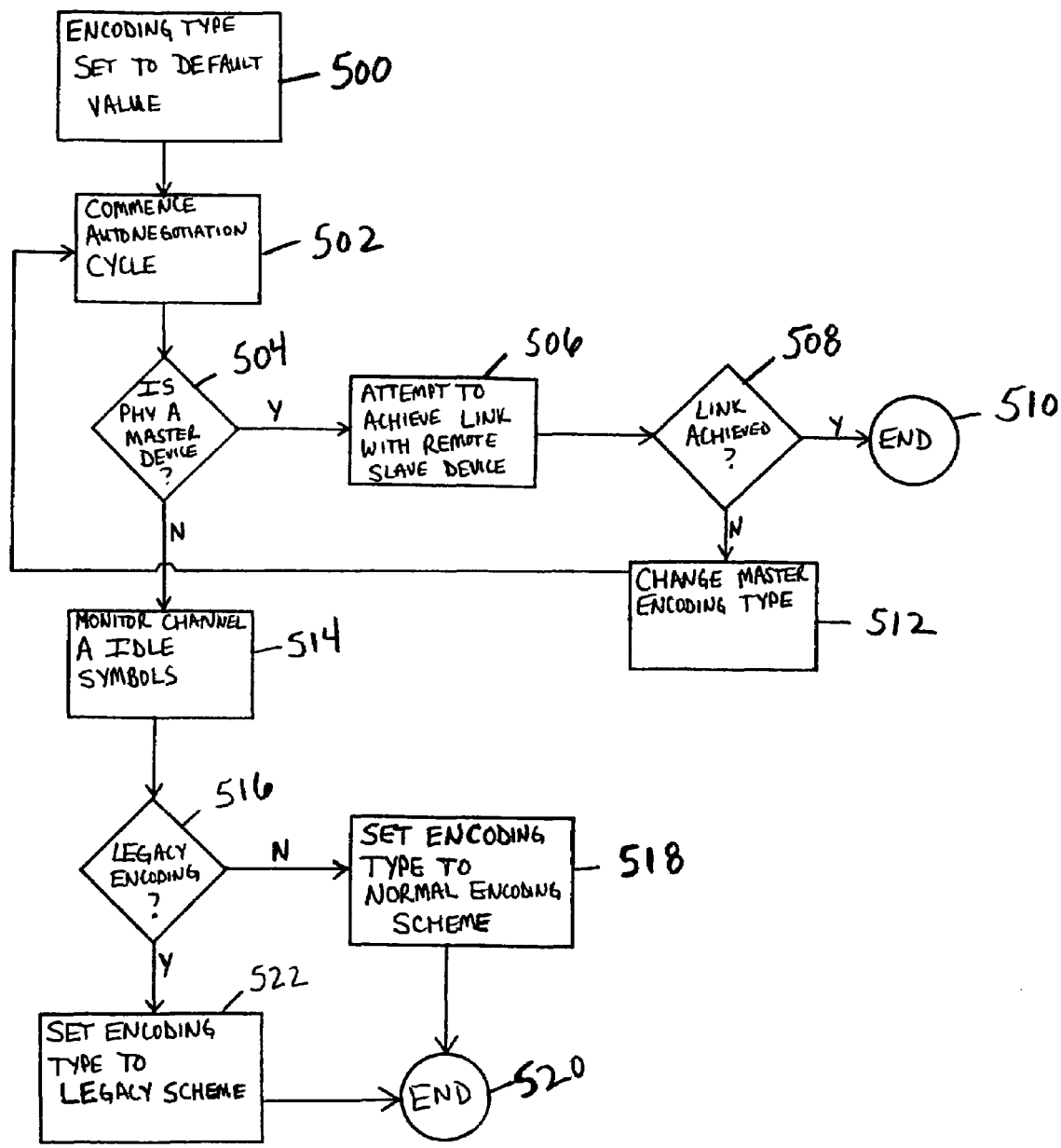
FIG. 6 is a flow chart depicting the operational flow of the present invention.

Referring now to FIG. 6, operation of PHY 314 is described in more detail. Operation begins at step 500, and the EncodingType variable is set to a default value (for example, to "0" corresponding to normal encoding/decoding). Operation hen proceeds to step 502, and the auto-negotiation process begins between PHY 314 and the PHY of a remote transceiver (for example, between the transceivers 102 and 104 shown in FIG. 1). At query block 504, PHY 314 determines whether it has resolved to a master device. If so, operation proceeds to step 506, and PHY 314 attempts to achieve link with the remote slave PHY device. At query block 508, PHY 314 determines whether link-up has been achieved with the remote PHY device. If so, operation terminates at step 510. On the other hand, if PHY 314 fails to achieve link-up with the remote PHY device (e.g., if PHY 314 does not receive the appropriate signal back from the remote slave PHY), then operation proceeds to step 512, and the value of EncodingType state variable is flipped (for example, from "0" to "1"). Operation then proceeds back to step 502, and autonegotiation is restarted, with PHY 314 again attempting to achieve link-up with the remote PHY device, but this time by transmitting symbols to the remote PHY device using the alternate encoding/decoding scheme.

If at query block 504 it is determined that PHY 314 has resolved to a slave device, then operation instead proceeds to step 514, and PHY 314 commences training based on the incoming signals from the remote (master) PHY device. During training, PHY 314 monitors the channel A IDLE data being transmitted by the remote master device. As described above, the idle symbols are generated via the bits $Sx_n[3:0]$ and $Sy_n[3:0]$. Thus, the IDLE symbols transmitted by the master PHY device will vary based on the value of $Sy_n[0]$. PHY 314 determines the value of $Sy_n[0]$ and thus determines whether the remote master PHY device is using legacy or normal encoding/decoding. At query block 516, PHY 314 determines whether the remote device is using legacy encoding/decoding. If not, operation proceeds to step 518, and the EncodingType state variable is set to "0" to correspond to normal (standard-compliant) encoding/decoding. Operation then ends at step 520.

If at query block 516 it is determined by PHY 314 that the remote device is using the legacy encoding/decoding scheme, then operation instead proceeds to step 522, and the EncodingType state variable is set to a "1" to correspond with legacy encoding/decoding. Opera-ion then ends at step 522. Then, when PHY 314 begins to transmit data to the master PHY device, it will transmit data according to the encoding/decoding scheme that the remote device is expecting (and capable of processing).

FIGS. 7 through 14 depict various scenarios that may be encountered during auto-negotiation in an effort to achieve a link between two transceivers PHY A and PHY B. In FIG. 7, both PHY A and PHY B are legacy-type transceivers. Thus, since the two transceivers are both using legacy encoding/decoding schemes, link-up is readily achieved during the auto-negotiation procedure.

FIG. 8 depicts a scenario in which the master PHY A is a legacy-type device, while slave PHY B is a device that can transmit data using either legacy or normal encoding/decoding schemes (hereinafter an "other" type of device). Thus, master PHY A transmits legacy encoded data on channel A IDLE, which is monitored by PHY B to determine the encoding type being used by PHY A. The EncodingType variable of PHY B is then set to "1" to correspond to the legacy encoding/decoding scheme, such that at the appropriate time slave PHY B transmits the appropriate legacy-encoded data to PHY A to achieve a link.

FIG. 9 depicts a scenario where slave PHY A is a legacy-type device, and PHY B is an other device that is initially set to the legacy-compliant encoding/decoding scheme. Thus, since both PHY A and PHY B are initially using legacy encoding, link-up is achieved during the first auto-negotiation cycle.

In FIG. 10, slave PHY A is a legacy device, while master PHY B is an other device that is initially set to a normal (standard-compliant) encoding scheme. Thus, PHY B transmits normal encoding over channel A IDLE, which cannot be properly processed by PHY A, thereby preventing link-up from being achieved. Thus, the encoding type of PHY B is flipped to legacy encoding, and the autonegotiation process is restarted. During the second autonegotiation cycle, both PHY A and PHY B are using legacy encoding, such that a link is achieved.

FIG. 11 depicts a scenario in which both PHY A and PHY B are other devices, and in which both are initially set to a legacy-compliant encoding/decoding scheme. Thus, during the first autonegotiation cycle, link-up is achieved.

In FIG. 12, both PHY A and PHY B are other devices, but master PHY A is initially set to a legacy encoding type, while slave PHY B is set to a normal encoding type. When master PHY A transmits the IDLE symbols over channel A, slave PHY B determines that PHY A is using legacy encoding, and PHY B sets its encoding type to legacy, such that link-up is achieved when PHY B begins to transmit data back to PHY A.

In FIG. 13, both PHY A and PHY B are other devices, and both are initially set to encode using the normal (standard-compliant) scheme. Thus, link-up is achieved in a straightforward manner in this case during the auto-negotiation cycle.

FIG. 14 depicts a scenario in which both master PHY A and slave PHY B are other devices, but in which PHY A is initially set to a normal encoding scheme, which PHY B is initially set to a legacy encoding scheme. Thus, PHY B will detect normal encoding and set its encoding type to the normal encoding/decoding scheme, such that when PHY B transmits data to PHY A it will be of the type expected by PHY A, thereby achieving a link.

Figure 15:
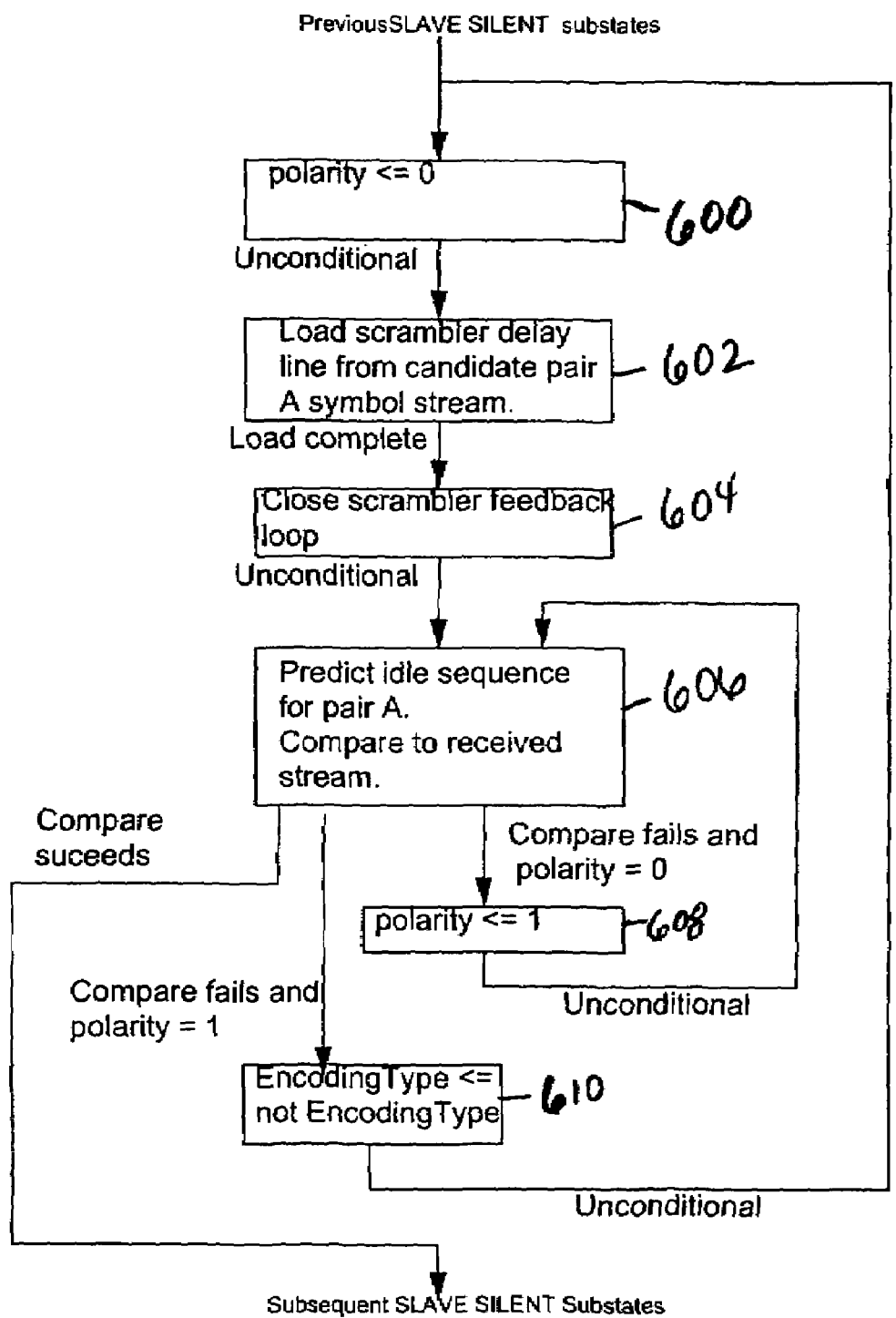
FIG. 15 is a flowchart depicting the operational flow of a slave device in performing encoding detection.

Referring now to FIG. 15, there is shown a flow chart depicting the operation of PHY 314 when it has resolved to a slave device in detecting the encoding type of the remote master device. As described above, the polarity of the data transmitted by the master device is varied to remove any dc bias from the signal. Thus, when comparing the incoming data with the expected data, the polarity of the incoming data may cause a false negative result.

In the process shown in FIG. 15, operation begins at step 600, with the polarity at the slave PHY 314 being set to 0. At step 602, PHY 314 loads the scrambler delay line with the symbol stream being transmitted over channel A, using the default encoding/decoding scheme according to the default setting of the EncodingType state variable. When the scrambler delay line is filled (i.e., after 33 symbols are received), operation proceeds to step 604, and the scrambler feedback loop is then closed.

At step 606, PHY 314 predicts the IDLE symbol sequence based on the setting of its EncodingType state variable and the following side-stream scrambler generator polynomials:

$g_m(x)=1+x^{13}+x^{33}$ for master $g_m(x)=1+x^{20}+x^{33}$ for slave.

Thus, PHY 314 expects the PCS of the remote master device to employ the first of the two polynomials. Then, at step 606, PHY 314 predicts the IDLE symbol sequence and compares it to the actual received stream. If the comparison is a match, then the encoding detection subroutine is completed.

If there is no match, and if the polarity is set to 0, operation proceeds to step 608, and the polarity is set to 1. Operation then proceeds back to step 606, and the comparison is performed again, but this time using the new polarity value. If the comparison now succeeds, then the encoding detection subroutine is completed.

If, however, there still is no match, and because the polarity is now set to 1, operation instead proceeds to step 610, and the value of the EncodingType state variable is flipped, so that the encoding/decoding scheme of PHY 314 (for both the transmitter and receiver) is switched from one scheme to the other. Operation then returns to step 600, and the entire process is repeated, with the scrambler delay line again being loaded, but this time using the other encoding/decoding scheme. In this manner, PHY 314 will not fail to achieve a link with the remote master device simply due to the polarity of the incoming data. The above-described routine addresses this issue. While the invention has been described primarily in connection with IEEE Standard 802.3 end a legacy-based encoding/decoding scheme, it will be understood by those skilled in the art that the invention has applicability in other situations as well. In addition, while in the illustrative embodiment of the invention, the PHY 314 is capable of encoding in two different encoding schemes, it will be understood that PHY 314 may be designed so that it can encode in three or more schemes.

From the foregoing, it will be apparent that the present invention provides a system and method that achieves interoperability between different types of transceivers. The system and method add an additional step to a conventional linkup procedure in order to facilitate achieving a link-up between two transceivers that otherwise could not achieve link-up. While certain exemplary embodiments have been described in detail and shown in the accompanying drawings, it is to be understood that such embodiments are merely illustrative of and not restrictive on the broad invention. It will thus be recognized that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and spirit of the invention as defined by the appended claims.

What is claimed is:

1. An apparatus for use in multi-channel communication comprising:
    a physical layer entity (PHY) including a physical coding sublayer (PCS) transmitter circuit that is operative to generate a plurality of encoded symbols according to one of at least two transmission encoding schemes;
    wherein the PHY is operative to select between the at least two encoding schemes; and
    wherein the PHY is operative upon assuming the role of a slave device to monitor data transmitted by a remote master device, determine the encoding type of the master device, and select the corresponding encoding scheme.

2. An apparatus for use in multi-channel communication comprising:
   a physical layer entity (PHY) including a physical coding sublayer (PCS) transmitter circuit that is operative to generate a plurality of encoded symbols according to one of at least two transmission encoding schemes;
   wherein the PHY operative to select between the at least two encoding schemes; and
   wherein the PHY is operative upon assuming the role of a master device to transmit data to a remote slave device, determine whether a link is achieved with the remote slave device, and select a different encoding scheme if a link is not achieved.

3. An apparatus for use in multi-channel communication comprising:
   a physical layer entity (PHY) including a physical coding sublayer (PCS) transmitter circuit that is operative to generate a plurality of encoded symbols according to one of at least two transmission encoding schemes;
   wherein the PHY is operative to select between the at least two encoding schemes; and
   wherein the PHY is operative in response to assuming the role of a slave device to monitor channel A IDLE symbols, to compare those symbols with expected symbols, and to automatically switch encoding schemes if no match is found.

4. The apparatus of claim 3, wherein the PHY is operative to initially set a polarity value to a first value, and to switch the polarity value to a second value if the comparison of received symbols with expected symbols fails.

5. An apparatus for use in multi-channel communication comprising:
   a physical layer entity (PHY) including a physical coding sublayer (PCS) transmitter circuit that is operative to generate a plurality of encoded symbols according to one of at least two transmission encoding schemes;
   wherein the PHY is operative to select between the at least two encoding schemes; and
   wherein the PHY is operative in response to assuming the role of a master device to transmit channel A IDLE symbols, to determine whether a link is achieved with a remote device, and to automatically switch encoding schemes if no link is established.

6. A method of achieving a communication link between a pair of transceivers, where one transceiver is a master device and the other transceiver is a slave device, the method comprising:
   generating, at the master device, a plurality of encoded symbols according to a first transmission encoding scheme;
   determining, at the master device, if a link is achieved with the slave device; and
   changing the encoding scheme at the master device if no link is achieved with the slave device.

7. The method of claim 6 wherein one of the transmission encoding schemes is based on a 1000BASE-T standard.

8. The method of claim 6 wherein one of the transmission encoding schemes is based on a legacy encoding standard.

9. A method of achieving a communication link between a pair of transceivers, where one transceiver is a master device and the other transceiver is a slave device, the method comprising:
   generating, at the master device, a plurality of encoded symbols according to a first transmission encoding scheme;
   transmitting the encoded symbols to the slave device;
   processing the encoded symbols at the slave device to determine the encoding scheme utilized by the master device; and
   setting the encoding type of the slave device to match that of the master device, if the encoding type of the slave device is set to a different encoding type.

10. The method of claim 9 wherein one of the transmission encoding schemes is based on a 1000BASE-T standard.

11. The method of claim 9 wherein one of the transmission encoding schemes is based on a legacy encoding standard.

12. The method of claim 9, wherein processing comprises monitoring channel symbols transmitted by the master device, comparing those symbols with expected symbols, and automatically switching encoding schemes if no match is found.

13. The method of claim 12, further comprising setting a polarity value of the slave device to a first value, and switching the polarity value to a second value if the comparison of received symbols with expected symbols fails.

* * * * *